«12» United States Patent
Reams

(10) Patent No.: US 9,094,723 B2
(45) Date of Patent: Jul. 28, 2015

(54) SYSTEMS AND METHODS FOR A REMOTE ALARM

(75) Inventor: William Reams, Englewood, CO (US)

(73) Assignee: EchoStar Technologies L.L.C., Englewood, CO (US)

( * ) Notice: Subject to any disclaimer, the term of this patent is extended or adjusted under 35 U.S.C. 154(b) by 736 days.

(21) Appl. No.: 12/336,268

(22) Filed: Dec. 16, 2008

(65) Prior Publication Data

US 2010/0154006 A1    Jun. 17, 2010

(51) Int. Cl.
*H04N 5/445* (2011.01)
*G06F 3/00* (2006.01)
*G06F 13/00* (2006.01)
*H04N 21/472* (2011.01)
*H04N 5/44* (2011.01)
*H04N 21/41* (2011.01)
*H04N 21/488* (2011.01)

(52) U.S. Cl.
CPC ....... *H04N 21/47214* (2013.01); *H04N 5/4403* (2013.01); *H04N 21/4126* (2013.01); *H04N 21/4882* (2013.01); *H04N 2005/441* (2013.01); *H04N 2005/4407* (2013.01)

(58) Field of Classification Search
CPC ............ H04N 21/4126; H04N 21/488; H04N 21/4882; H04N 21/47214; H04N 5/4403; H04N 2005/4407; H04N 2005/441
USPC ...................................... 725/56, 58
See application file for complete search history.

(56) References Cited

U.S. PATENT DOCUMENTS 4,067,000 A    1/1978 Carlson
4,231,026 A    10/1980 Sullivan
4,578,671 A    3/1986 Flowers
(Continued)

FOREIGN PATENT DOCUMENTS

EP    1 701 539 A2    9/2006
GB    2331610    5/1999
(Continued)

OTHER PUBLICATIONS

Osoinach, Bryce, "Proximity Capacitive Sensor Technology for Touch Sensing Applications", Proximity Sensing White Paper prepared for Freescale Semiconductor, Inc., Tempe, Arizona, 2007, 12 Pages.

(Continued)

*Primary Examiner* — Brian T Pendleton
*Assistant Examiner* — Alan Luong
(74) *Attorney, Agent, or Firm* — Lowe Graham Jones PLLC

(57) ABSTRACT

Systems and methods of issuing a reminder from a remote control are disclosed. In at least one embodiment, an exemplary embodiment has a remote control and a set top box (STB). In at least one embodiment, the remote control has a transmitter that transmits information corresponding to at least one reminder event with a reminder time, a reminder alert receiver that receives a reminder alert, and at least one of a sound emitter that issues audible reminder alerts, a vibration generator that issues vibration reminder alerts, and a light source that issues visible reminder alerts. In at least one embodiment, the STB has a receiver that receives the information corresponding to the reminder event from the remote control, a STB processing system that generates a reminder alert based upon the received reminder event, and a reminder alert transmitter that transmits the reminder alert to the remote control.

18 Claims, 3 Drawing Sheets

(56) References Cited

U.S. PATENT DOCUMENTS

| | | |
|---|---|---|
| 5,115,236 A | 5/1992 | Kohler |
| 5,164,652 A | 11/1992 | Johnson et al. |
| 5,204,657 A | 4/1993 | Prosser |
| 5,294,915 A | 3/1994 | Owen |
| 5,455,560 A | 10/1995 | Owen |
| 5,506,572 A | 4/1996 | Hills et al. |
| 5,598,143 A | 1/1997 | Wentz |
| 5,638,050 A * | 6/1997 | Sacca et al. ............ 340/571 |
| 5,926,090 A | 7/1999 | Taylor |
| 5,945,918 A | 8/1999 | McGonigal |
| 5,963,010 A | 10/1999 | Hayashi et al. |
| 5,990,868 A | 11/1999 | Frederick |
| 5,999,799 A | 12/1999 | Hu |
| 6,191,551 B1 | 2/2001 | Fischer et al. |
| 6,373,256 B1 | 4/2002 | Hanjani et al. |
| 6,535,125 B2 | 3/2003 | Trivett |
| 6,573,832 B1 | 6/2003 | Fugere-Ramirez |
| 6,938,101 B2 * | 8/2005 | Hayes et al. ............ 710/5 |
| 6,985,069 B2 | 1/2006 | Marmaropoulos |
| 7,009,528 B2 | 3/2006 | Griep |
| 7,140,033 B1 | 11/2006 | Durden et al. |
| 8,082,455 B2 | 12/2011 | Reams |
| 8,134,475 B2 | 3/2012 | Reams |
| 2003/0035074 A1 | 2/2003 | Dubil et al. |
| 2003/0140343 A1 | 7/2003 | Palvo et al. |
| 2003/0149978 A1 * | 8/2003 | Plotnick ............ 725/39 |
| 2003/0159146 A1 | 8/2003 | Kim |
| 2004/0051638 A1 | 3/2004 | Green |
| 2004/0148632 A1 | 7/2004 | Park et al. |
| 2004/0168187 A1 | 8/2004 | Chang |
| 2004/0203554 A1 | 10/2004 | Simon |
| 2005/0105396 A1 * | 5/2005 | Schybergson ............ 368/12 |
| 2005/0204388 A1 * | 9/2005 | Knudson et al. ............ 725/58 |
| 2006/0034611 A1 | 2/2006 | Li |
| 2006/0190966 A1 * | 8/2006 | McKissick et al. ............ 725/61 |
| 2006/0259924 A1 * | 11/2006 | Boortz ............ 725/32 |
| 2007/0018845 A1 | 1/2007 | Sutardja |
| 2007/0162939 A1 * | 7/2007 | Bennett et al. ............ 725/74 |
| 2008/0088748 A1 | 4/2008 | Lim |
| 2008/0163049 A1 | 7/2008 | Krampf |
| 2009/0070840 A1 * | 3/2009 | Kamimaki et al. ............ 725/114 |
| 2009/0094645 A1 * | 4/2009 | Ting et al. ............ 725/39 |
| 2009/0122206 A1 * | 5/2009 | Jung ............ 348/734 |
| 2009/0243909 A1 | 10/2009 | Reams |
| 2009/0303097 A1 | 12/2009 | Reams et al. |
| 2010/0013551 A1 | 1/2010 | Reams |
| 2010/0208146 A1 | 8/2010 | Reams |
| 2011/0156862 A1 | 6/2011 | Langer |

FOREIGN PATENT DOCUMENTS

| | | |
|---|---|---|
| JP | 11355153 A | 12/1999 |
| JP | 130848 | 5/2000 |

OTHER PUBLICATIONS

Reams, William R., "Systems and Methods for Controlling the Power State of Remote Control Electronics", U.S. Appl. No. 12/056,520, filed Mar. 27, 2008.

Reams, William R., "Reduction of Power Consumption in Remote Control Electronics", U.S. Appl. No. 12/056,819, filed Mar. 27, 2008.

Reams, William R., "Systems, Methods, and Apparatus for Providing an Audio Indicator via a Remote Control", U.S. Appl. No. 12/389,272, filed Feb. 19, 2009.

Reams, William, "Systems and Methods for Controlling Power Consumption in Electronic Devices", U.S. Appl. No. 12/175,897, filed Jul. 18, 2008.

Reams, William. "Backlighting Remote Controls", U.S. Appl. No. 12/404,848, filed Mar. 16, 2009.

Reams, William, "Systems, Methods and Apparatus for Changing an Operational Mode of a Remote Control", U.S. Appl. No. 12/135,370, filed Jun. 9, 2008.

U.S. Appl. No. 12/389,272, filed Feb. 19, 2009, Final Office Action mailed May 29, 2012, 22 pages.

* cited by examiner

SYSTEMS AND METHODS FOR A REMOTE ALARM

BACKGROUND

Programming service providers provide subscribers a large number of programs to select from, including movies, television programs, commercial programs, music, and other forms of data. A large number of programs may be aggregated together into one or more communicated streams of program content for delivery to the subscriber. The programming is typically delivered to a content receiving device using a suitable media delivery system, such as a cable system or a satellite system.

The content receiving device, referred to as a set top box (STB), is configured to deliver one or more selected programs to a media presentation device coupled to or within the STB. Nonlimiting examples of media presentation devices are televisions (TVs), personal computers (PCs), stereos, personal digital assistants (PDAs), surround-sound systems, and digital video recorders (DVRs). Particular programs may be selected by a user who provides program selection instructions to the STB. The selected program may then be presented to the user. For example, if the selected program is a movie, the video portion of the movie is displayed on a display of the TV, the PC, or the like. The audio portion of the movie may concurrently be presented over the speakers of the TV, the stereo, or the surround-sound system. In some instances, the selected program may be stored into a DVR or other recording device for later retrieval and presentation. The DVR may be an integrated component of the STB, or the DVR may be a stand-alone device that is communicatively coupled to the STB.

Controls are typically provided on the STB for the user to input their programming selections. Alternatively, or additionally, a remote control device may be in communication with the STB via a suitable wireless signal, such as a radio frequency (RF) signal or an infrared signal. Typically, the remote control device is a relatively small, hand-held unit. Some remote control devices are configured to control multiple devices and the STB. Some remote controls contain a buzzer or other alert device. Also, some remote control devices may include a small display thereon for presenting messages or other information to the user.

The remote control device is traditionally a one-way communication device wherein programming selection instructions, input by the user, are communicated to the STB via the wireless signal. For example, the user may select a programming channel by specifying a number or another suitable identifier associated with the programming channel that is delivering a program of interest. Upon selection of the programming channel, the program of interest associated with the selected programming channel is parsed from the received stream of programming content, and is then presented to the user on their TV and/or recorded on a DVR or the like.

As another example, the user may select a program of interest that is scheduled for presentation at a future time and/or date. The scheduled programming channel, and the time and/or the date of the program of interest, is typically presented to the user on a display in the form of an electronic program guide (EPG) that is presented on the display. The user may scroll through the EPG to until the program of interest is located on the EPG schedule, and then the user may select that program of interest for future presentation and/or recording by providing suitable commands to the STB using the remote control. Thus, a series of user input commands communicated from the remote control device to the STB allow the user to navigate through the EPG to locate and select the program of interest scheduled for future presentation. Other processes may be used to identify and select the program of interest for future presentation and/or recording.

In some media systems, the user may be reminded of the start of a program of interest, previously selected for presentation, by presentation of an icon, pop-up message, or the like on the display of their TV or media device. However, the user must be viewing the display to see the reminder notification presented on the display. If the user is not viewing the display when the reminder notification is presented, the user would miss the reminder notification, and accordingly, might miss the start of the program of interest.

SUMMARY

Systems and methods of issuing a reminder from a remote control are disclosed. An exemplary embodiment has a remote control and a set top box. The remote control comprises a transmitter configured to transmit information corresponding to at least one reminder event with a reminder time, a reminder alert receiver configured to receive a reminder alert, and at least one of a sound emitter configured to issue an audible reminder alert, a vibration generator configured to issue a vibration reminder alert, and a light source configured to issue a visible reminder alert. The set top box comprises a receiver configured to receive the information corresponding to the reminder event from the remote control, a set top box (STB) processing system configured to generate a reminder alert based upon the received reminder event, and a reminder alert transmitter configured to transmit the reminder alert to the remote control.

In accordance with further aspects, an exemplary embodiment issues a reminder from a remote control, receives a specification for an event of interest with at least a reminder time, compares the current time with the reminder time, and in response to the current time reaching the reminder time, issues a reminder alert from the remote control.

BRIEF DESCRIPTION OF THE DRAWINGS

Preferred and alternative embodiments are described in detail below with reference to the following drawings.

DETAILED DESCRIPTION

Figure 1:
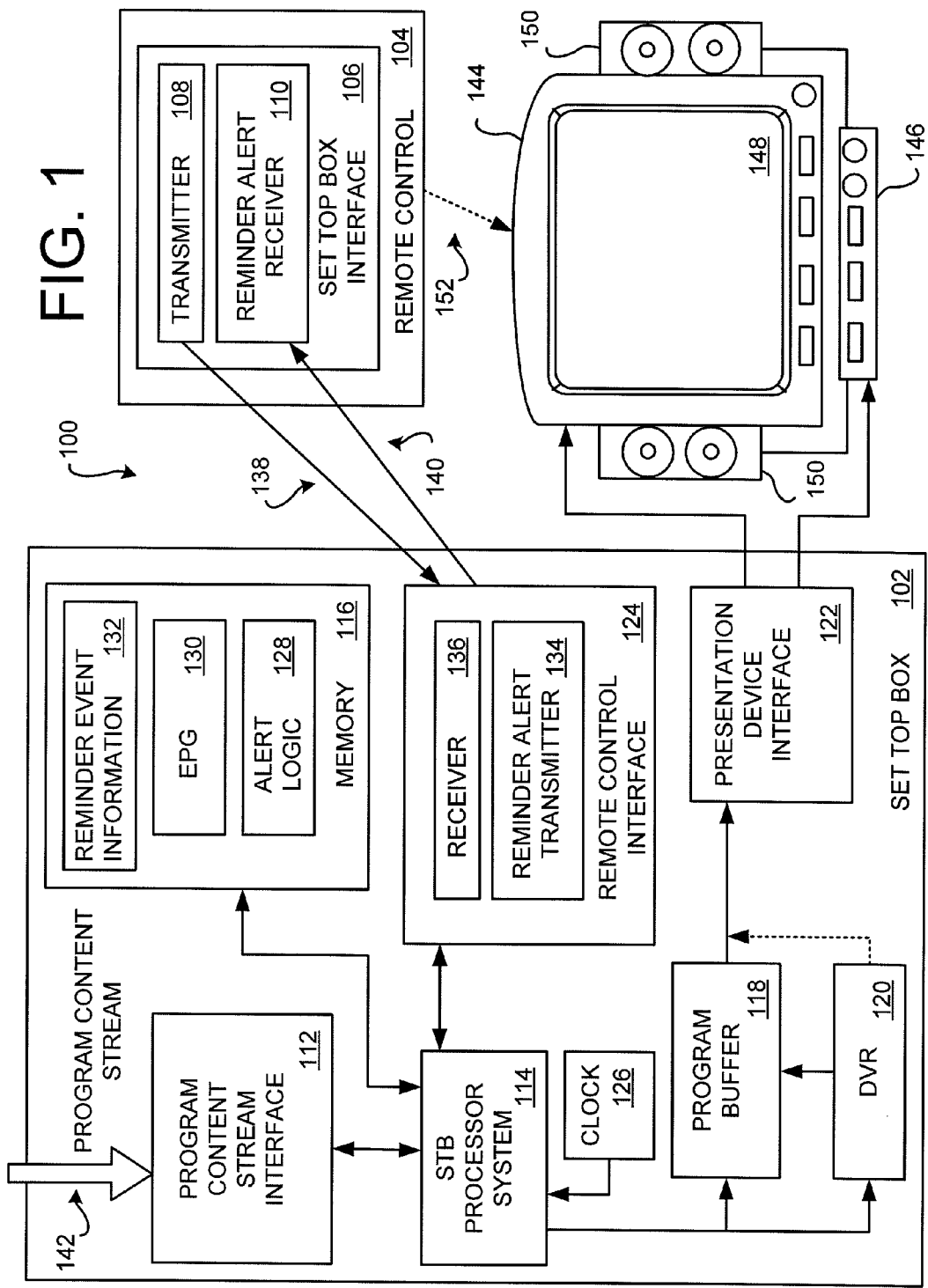
FIG. 1 is a block diagram of an embodiment of the remote control reminder alert system.

FIG. 1 is a block diagram of an embodiment of the reminder alert system 100. An exemplary embodiment of the reminder alert system 100 is implemented in a set top box 102 and a media system remote control 104 that is configured to communicate user commands to the set top box 102. The remote control 104 comprises a set top box interface 106 having a transmitter 108 and a reminder alert receiver 110. The exemplary set top box 102 comprises a program content stream interface 112, a set top box (STB) processor system 114, a memory 116, a program buffer 118, an optional digital video recorder (DVR) 120, a presentation device interface 122, a remote control interface 124, and an optional clock 126. The memory 116 comprises portions for storing an alert logic 128, an electronic program guide (EPG) 130, and a reminder event information 132. The remote control interface 124 comprises a reminder alert transmitter 134 and a receiver 136.

The remote control 104 communicates a wireless signal 138 from its transmitter 108 to the receiver 136 in the set top box 102. The wireless signal 138 includes information corresponding to user commands indicating the user's selection of programming and/or identification of one or more events of interest scheduled to occur at some future time. The time, and optionally the date, of the future scheduled program of interest and/or the future event of interest are defined as reminder events. Optionally, reoccurring scheduled programs of interest and/or the future events of interest may be defined as reminder events.

Embodiments of the reminder alert system 100 are configured to compare the current time with the time and date associated with the reminder event. In an exemplary embodiment, when the current time reaches the time and date corresponding to the reminder event, a wireless reminder alert signal 140 is communicated from the reminder alert transmitter 134 in the set top box 102 to the reminder alert receiver 110 in the remote control 104. In response to receiving the reminder alert signal 140, the remote control 104 emits an audible or visual reminder alert.

The reminder alert may be issued prior to the reminder event by a relatively small, predefined period of time prior so as to provide sufficient time for the user to respond. For example, if the reminder alert pertains of a scheduled program of interest, the reminder alert is issued just prior to the scheduled presentation time of the program of interest, thereby providing the user time to turn on their television and/or change channels.

Alternatively, information pertaining to the reminder event may be transmitted to the remote control 104 prior to the scheduled time. The received reminder event is stored in the remote control 104. When the current time reaches the time and date corresponding to the reminder event, the remote control 104 generates and emits an audible or visual reminder alert.

In an alternative embodiments, information pertaining to the reminder event (e.g., tones or display messages) is transmitted to the remote control 104 prior to the scheduled time of issuance of the reminder alert. The received reminder event information is stored in the remote control 104. When the current time, monitored by the set top box 102, reaches the time and date corresponding to the reminder event, the set top box 102 sends a command to the remote control 104 which triggers the reminder alert issuance by the remote control 104.

The functionality of the set top box 102 is now broadly described. One or more program content streams 142 are received by the program content stream interface 112. One or more tuners (not shown) in the program content stream interface 112 selectively tune to one of the program content streams 142 in accordance with instructions received from the STB processor system 114. A program content stream 142 typically comprises a plurality of programs multiplexed together. The STB processor system 114, based upon a request for a program of interest specified by a user via the remote control 104, parses out program content associated with the program of interest. The program content is then assembled into a stream of video and/or audio information which may be saved into the program buffer 118 such that the program content can be streamed out to a media presentation device, via the presentation device interface 122. Alternatively, or additionally, the parsed out program content may be saved into the DVR 120 for later presentation.

In this simplified embodiment, the presentation device interface 122 is illustrated as coupled to two exemplary media presentation devices, a television (TV) 144 and a surround-sound receiver 146. The video portion of the streamed program content is displayed on the TV display 148 and the audio portion of the streamed program content is reproduced as sounds by the speakers 150.

The remote control 104 may be configured to communicate user commands to the TV 144, the surround-sound receiver 146, and other devices, via a wireless signal 152. For example, a characteristic of the video image presented on the TV display 148, such as the image contrast, may be adjusted to a preferred level by the user by inputting commands via the remote control 104. As another non-limiting example, the audio volume of the sound emitted by the speakers 150 may be adjusted by the user via the remote control 104. Any suitable wireless medium may be used for the wireless signal 152, such as, but not limited to, infrared or radio frequency (RF).

From time to time, information populating the EPG 130 portion of the memory 116 is communicated to the set top box 102 via the program content stream 142. The EPG 130 portion of the memory 116 stores the information pertaining to the scheduled programming. The information may include, but is not limited to, a scheduled presentation start and/or end time, a program channel, and descriptive information. The program's descriptive information may include the title of the program, names of performers or actors, date of creation, and a summary describing the nature of the program. Any suitable information may be included in the program's supplemental information.

Upon receipt of a command from the remote control 104 requesting presentation of an EPG display, the information in the EPG is retrieved, formatted, and then presented on the display 148. A user, by inputting commands via the remote control 104, may scroll through the displayed EPG and select a program of interest. If the program of interest is scheduled for presentation at a future time, a reminder event corresponding to the time and/or date of the scheduled presentation of the program of interest is defined and stored into the reminder event information 132.

In an exemplary embodiment, the alert logic 128, when retrieved from memory 116 and executed by the STB processor system 114, provides instructions to the STB processor system 114 to monitor the current time and/or date. The current time and/or date may be provided by the clock 126, and/or may be encoded into the program content stream 142. When the current time and/or date approaches to the scheduled time and/or date of the reminder event by some predefined threshold, the reminder alert is generated and communicated to the remote control 104, via the wireless signal 140.

The STB processor system 114 may be any suitable processing system that is interfaced with other components of the set top box 102 (not shown) and/or that performs many different functions (not described herein) related to processing media information and/or presenting media information. Alternatively, the STB processor system 114 may be a dedicated processor system that generates the reminder alerts.

Figure 2:
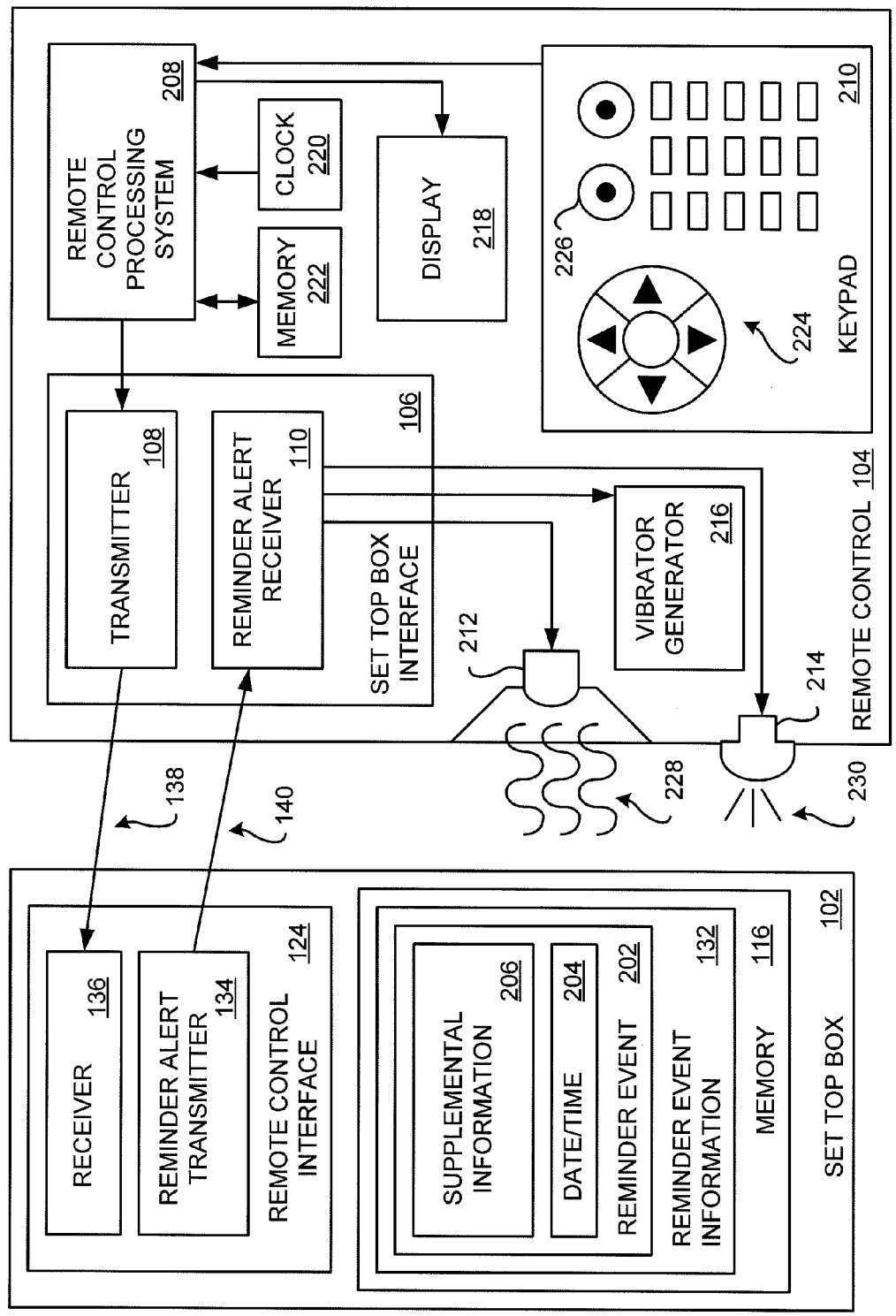
FIG. 2 is a block diagram illustrating in greater detail an embodiment of the set top box 102 and the remote control.

FIG. 2 is a block diagram illustrating in greater detail an embodiment of the set top box 102 and the remote control 104. In an exemplary embodiment, one or more reminder events 202 are stored in the reminder event information 132 portion of the memory 116 of the set top box 102. The reminder event 202 includes the reminder time 204 that identifies the time and/or date when a corresponding reminder alert is to be presented to a user.

As noted herein, information describing characteristics of the selected program of interest is delivered in the program content stream 142. Such supplemental information may be, for example, included in the EPG 130. When a reminder event 202 is stored, the information associated with a selected program of interest may be saved as the supplemental information 206. In another exemplary embodiment, the information associated with a selected program of interest may be, at the time of transmittal of the reminder alert to the remote control 104, retrieved from the EPG 130. When the reminder event 202 pertains to a program of interest, the supplemental information 206 may include, but is not limited to, the title of, or other information pertaining to, the program of interest that the reminder alert is reminding the user of. The supplemental information 206 may be presented substantially concurrently with the issuance of the reminder alert from the remote control 104.

As noted herein, a reminder alert may be generated for a user defined event of interest. User specified information relating to the event of interest may be saved as supplemental information 206. Accordingly, the user specified information does not need to be related to program content received by the set top box 102. The user specified supplemental information 206 may be presented substantially concurrently with the issuance of the reminder alert from the remote control 104.

The remote control 104 comprises a remote control processing system 208, a keypad 210, and at least one of a sound emitter 212, a light source 214, or a display 218. Additionally, the remote control 104 may comprise an optional clock 220 and/or an optional memory 222. In some embodiments, a vibrator generator 216 is included in the remote control 104. The vibrator generator 216 generates a vibratory motion such that a person in contact with or proximity to the vibrating remote control 104 becomes aware of the issued reminder alert.

The keypad 210 includes a plurality of actuators 224 which the user actuates to input a command. The actuators 224 may be buttons, switches, multiple function controllers, touchpads, free space pointing devices, etc. Optionally, an actuator 226 may be included to communicate the intention of the user to designate a future scheduled program of interest and/or a future event of interest as a reminder event 202 so that embodiments of the reminder alert system 100 generate a reminder alert at the reminder time 204 corresponding to the reminder event 202. For example, after highlighting a program of interest listed on an EPG, the user actuates the actuator 226 to cause the reminder alert system 100 to define the reminder event 202, which may be then saved into the reminder alert information 132 in an exemplary embodiment. The actuator 226 may be a dedicated actuator reserved for specifying the reminder event 202, or the actuator 226 may be a multi-function actuator used for other purposes.

When the time (and/or date) arrives to present a reminder alert to the user, the supplemental information 206 corresponding to the reminder event 202 is retrieved from the reminder alert information 132. Then, an exemplary embodiment of the reminder alert system 100 generates a corresponding reminder alert and optionally retrieves the supplemental information 206 if such information is available. The reminder alert is communicated from the reminder alert transmitter 134 residing in the set top box 102. The reminder alert is received by the reminder alert receiver 110 residing in the remote control 104. Accordingly, the supplemental information 206 is presented substantially concurrently on the display 148 with transmittal of the reminder alert to the remote control 104.

In an exemplary embodiment, the reminder alert receiver 110 is communicatively coupled to the sound emitter 212. The reminder alert receiver 110 may be directly coupled to the sound emitter 212, or may be coupled to the sound emitter 212 via one or more intermediary devices, such as, but not limited to, the remote control processing system 208. The reminder alert is issued from the sound emitter 212 as an audible reminder alert 228, such as a buzzer, beep, or other audible sound. An exemplary sound emitter 212 is a speaker. Other devices may issue audible alerts in alternative embodiments. The audible reminder alert is intended to be noticeable by the user who is within hearing distance of the remote control 104. When the user hears the reminder alert being issued from the remote control 104, the user will realize that a reminder alert has been presented and will appreciate the nature of the reminder (assuming that the user is the individual who took actions, via the remote control 104, to schedule the issuance of the reminder alert).

Additionally, or alternatively, the reminder alert receiver 110 is communicatively coupled to the light source 214. The reminder alert receiver 110 may be directly coupled to the light source 214, or may be coupled to the light source 214 via one or more intermediary devices. A reminder alert issued from the light source 214 is an emitted light 230 that is presumably within the visual sight of the user. The emitted light 230 may be relatively bright, have a noticeable color, and/or may be intermittent, so as to catch the attention of the user. When the user sees the reminder alert being issued from the remote control 104, the user will realize that a reminder alert has been presented and will appreciate the nature of the reminder (assuming that the user is the individual who took actions, via the remote control 104, to schedule the issuance of the reminder alert).

In embodiments wherein the reminder alert issues from a speaker or the like, the volume of the audible reminder alert may be configured to increase as time progresses. In embodiments where the reminder alert is presented as visible light, the intensity of the light may be configured to increase as time progresses. The increasing volume of the audible reminder alert and/or the increasing intensity of a visible reminder alert are intended to increase the likelihood that the user will perceive the reminder alert without startling them upon initiation of the reminder alert.

Some embodiments may include the display 218 on the remote control 104. In such embodiments, a reminder alert (or if the reminder event 202 is received and stored in the memory 222 of the remote 104) may include the supplemental information 206. Accordingly, the supplemental information 206 is presented on the display 218 substantially concurrently with issuance of the reminder alert from the remote control 104.

Figure 3:
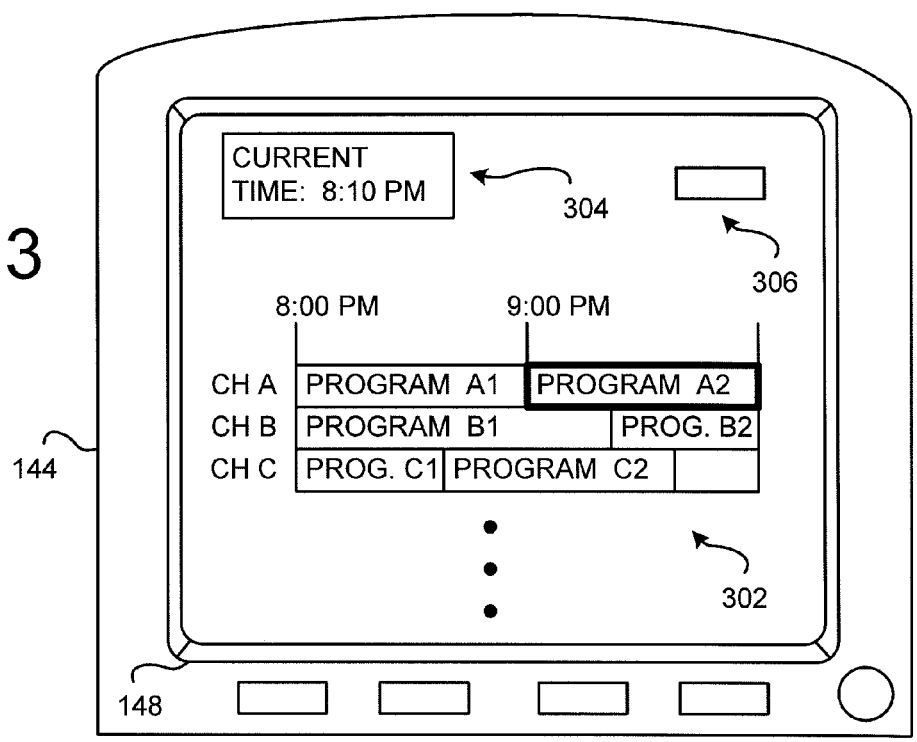
FIG. 3 is a diagram illustrating a hypothetical view of a display upon which an exemplary EPG is displayed.

FIG. 3 is a diagram illustrating a hypothetical view of a display 148 upon which an exemplary EPG 302 is displayed. To conceptually describe how a user may interactively designate a reminder event 202 based upon a program of interest, a portion of an EPG 302 is illustrated. Here, the user has selectively highlighted "program A2" on the EPG 302. The "program A2" is scheduled for presentation on the channel "CHA" at 9:00 p.m. The current time of 8:10 p.m. is indicated on the display 148 on the pop-up pane 304.

In an exemplary embodiment, the actuator 226 (FIG. 2) is actuated by the user to cause the reminder alert system 100 to define a reminder event 202 for a reminder time 204 of 9:00 p.m., which corresponds to the beginning of the presentation of the highlighted "program A2" on the EPG 302. Accordingly, a reminder alert is issued at 9:00 p.m.

In an alternative embodiment, the user does not need to actuate the actuator 226 to cause the reminder alert system 100 to define a reminder event 202 for the current date at 9:00 p.m. The selection of the "program A2" for presentation and/or recording at a future time automatically causes the reminder alert system 100 to define a reminder event 202 for the reminder time 204 of 9:00 p.m. The reminder alert may be issued prior to 9:00 p.m. be a relatively small, predefined period of time prior to 9:00 p.m.

In other embodiments, the user is able to identify programs of interest scheduled for future presentation and/or recording using other systems and/or methods. For example, a title search or topical search graphical user interface may allow a user to search for a program of interest by title or the like. Once the program of interest is located on the graphical user interface, the user selects the program of interest for presentation and/or recording. The reminder alert system 100 then defines a reminder event 202 for the date and time of the selected program of interest. As other non-limiting examples, the user may specify a channel, a presentation and/or record start time/date, and/or an end presentation or record time/date. In some embodiments, the user may select a recurring alert such as all new occurrences of a particular show of interest. In some embodiments, the user may specify a presentation and/or record time period. Here, the reminder alert system 100 defines a reminder event 202 based upon the user specified information.

In some embodiments where the actuator 226 is not available, or where the user chooses not to use the actuator 226, a pop-up icon 306 may be displayed to the user. The pop-up icon may include sub-icons for refined selections such as "one time event" or "recurring event". Upon selection of the pop-up icon 306, the reminder alert system 100 defines a reminder event 202 for the specified time.

Figure 4:
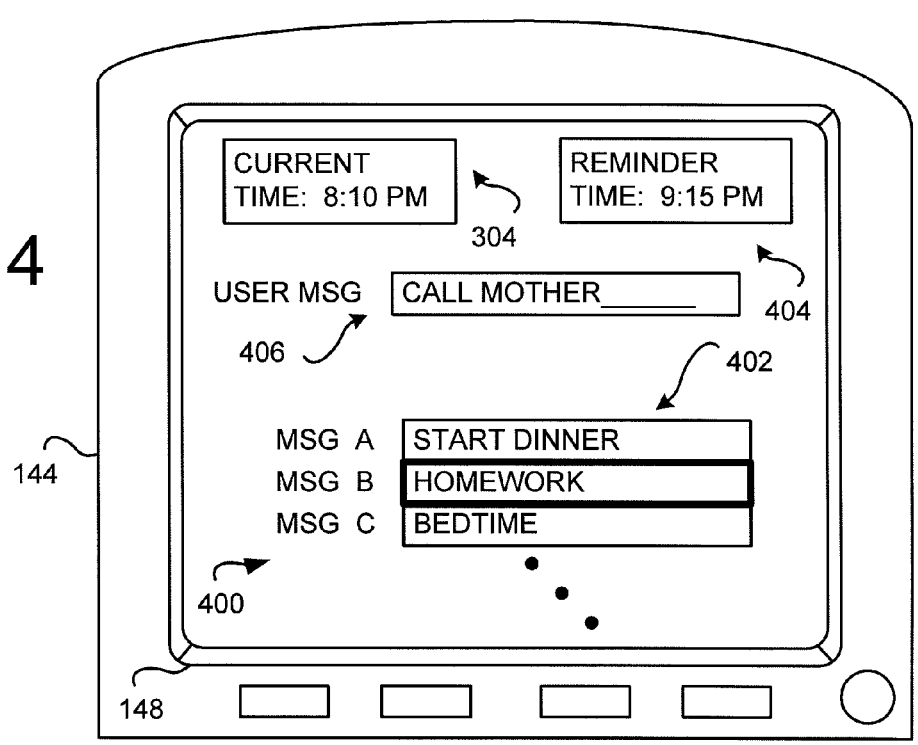
FIG. 4 is a diagram illustrating a hypothetical view of a display upon which an reminder event message menu is displayed.

FIG. 4 is a diagram illustrating a hypothetical view of a display 148 upon which a graphical user interface (GUI) 400 with a reminder event message menu 402 is displayed. To conceptually describe how a user may interactively designate a reminder event 202 based upon an event of interest, a portion of the graphical user interface 400 is illustrated. Here, the user may specify information pertaining to the event of interest via commands entered with the remote control 104 (or via controls on the set top box 102). In response to the user specifying at least the reminder time 204 of the event of interest, the reminder alert system 100 defines a reminder event 202 for the specified reminder time 204.

Some embodiments may require specification of a date of the event of interest. Alternatively, if the date of the event of interest is omitted or not required, the reminder alert system 100 assumes that the date of the event of interest is the current date.

In some embodiments, the graphical user interface 400 presents a list of predefined messages 402. For example, a first message ("MSG A") indicates that the user should start preparing dinner at some predefined time. A second message ("MSG B") indicates that the user, or possibly a child in the household, should start their homework at some predefined reminder time 204. A third message ("MSG C") indicates that the user, or possibly another person in the household, should go to bed at some predefined reminder time 204. Any suitable number and type of predefined messages may be saved into the memory 116 of the set top box 102 and/or the memory 222 of the remote control 104. The particular message that is of interest or that is most relevant to the event of interest is highlighted and selected by the user. In an exemplary embodiment, information corresponding to the selected message is stored to the supplemental information 206 portion of memory 116 (FIG. 1). In another embodiment, the stored reminder event includes a pointer or the like to the selected message, such that when the reminder alert is communicated to the remote control 104, information corresponding to the selected message is retrieved as the supplemental information 206.

Additionally, a reminder time 204 (and optionally a date) is specified by the user. A pop-up pane 404 is presented to the user so that the user may specify the reminder time 204 (and optionally the date) that the alert reminder is to be presented. Alternatively, or additionally, the user may specify a relative time, countdown time, or other time period which defines the reminder time 204. The alert reminder will be presented at the conclusion of the specified relative time, countdown time, or other time period.

The pop-up pane 404 may be presented to the user concurrently with the list of predefined messages 402. Alternatively, the pop-up pane 404 may be presented to the user after selection of one of the predefined messages 402.

Some embodiments may have the display 218 included on the remote control 104. In such an embodiment, the graphical user interface 400 and/or the pop-up pane 404 is presented to the user on the display 218.

Once the user has selected one of the predefined messages 402 and has specified the reminder time 204 (and optionally the date) that the reminder alert is to be presented, the reminder alert system 100 defines a reminder event 202 for the reminder time 204 of the specified event of interest. In embodiments that present the supplemental information 206 on a display, the selected predefined message 402 is concurrently presented at the time that the alert reminder is issued from the remote control 104.

Alternatively, or additionally, the user may specify their own personal user message that is associated with the reminder event 202 and that is saved as part of the supplemental information 206. For example, an exemplary embodiment presents a message pop-up pane 406 which has a region where the user may specify alpha-numeric characters that constitute a personal message. To illustrate, the user has specified a personal user message of "call mother" and has specified a reminder time of 9:15 p.m. (Here, the current time in this example is 8:10 p.m. as indicated in the pop-up pane 304.) Accordingly, a reminder alert is issued from the remote control 104 at 9:15 p.m. Optionally, the personalized message "call mother" is presented on a display.

Personal user messages may be specified using any suitable user interface. For example, a calendar display may be presented to the user. The user may then navigate through the calendar display and specify the time (and optionally the date) that a reminder alert is to be issued from the remote control 104. In other embodiments, a key pad may be used by the user to specify a personal user message. Such a keypad could be buttons on the remote control 104 or set-top box 102. Alternatively, or additionally, a virtual keypad on the display 148 or 218 may be is navigated by the user to select the desired alphanumeric characters.

In some embodiments, the reminder alert receiver 110 and/or the reminder alert transmitter 134 are dedicated devices used for communication of information corresponding to the reminder events and reminder alerts. In other embodiments, the reminder alert receiver 110 and/or the reminder alert transmitter 134 are used for communicating other types of information between the set top box 102 and the remote control 104. As noted herein, the transmitter 108 may or may not be used to communicate with devices other than the set top box 102, such as the TV 144.

The transmitter 108 and the reminder alert receiver 110 residing in the remote control 104 were described hereinabove as separate devices. In such an embodiment, the transmitter 108 in the remote control 104 and the receiver in the set top box 102 may be configured to communicate with each other using a particular wireless medium, such as, but not limited to, infrared light or RF. The reminder alert transmitter 134 in the set top box 102 and the reminder alert receiver 110 in the remote control 104 may be configured to communicate with each other using a different wireless medium, such as, but not limited to, a RF signal. The use of the RF signal may be advantageous in that the remote control 104 would not need to be within a line of sight of and pointed at the set top box 102 to receive a reminder alert, as is otherwise required for communication of visible light.

In an alternative embodiment, the transmitter 108, the receiver 136, the reminder alert transmitter 134, and the reminder alert receiver 110, are configured to communicate using the same wireless medium. For example, RF signals could be used for communication of commands from the remote control 104 to the set top box 102, and for communication of reminder alerts from the set top box 102 to the remote control 104. Accordingly, in alternative embodiments, the transmitter 108 and the reminder alert receiver 110 residing in the remote control 104 are configured as a transceiver that receives and transmits RF signals. Similarly, the reminder alert transmitter 134 and the receiver 136 residing in the set top box 102 may be configured as a transceiver that receives and transmits RF signals.

In alternative embodiments, the transmitter 108, the receiver 136, the reminder alert transmitter 134, and the reminder alert receiver 110, are configured to communicate using light, such as, but not limited to, infrared light. Information corresponding to the reminder event is communicated from the set top box 102 to the remote control 104 prior to the time that the reminder alert is to be issued, such as when the remote control 104 is in communication with the set top box 102 during the process of receiving user commands transmitted from the remote control 104. Accordingly, the reminder event 202 is stored in the memory 222 of the remote control 104. The optional clock 220 in the remote control 104 provides real time information to the remote control processing system 208 such that when the time arrives to issue the reminder alert, the remote control processing system 208 retrieves the reminder event 202 from the memory 222 and issues the audible reminder alert 228 and/or the visible reminder alert 230.

Some embodiments of the reminder alert system 100 may require actuation of actuator 226 (FIG. 2), may require selection of the pop-up icon 306 (FIG. 3), or may require some other action by the user, to acknowledge the issued reminder alert. Upon acknowledgement by the user, the reminder alert system 100 discontinues the reminder alert. Additionally, or alternatively, the reminder alert may be discontinued after expiration of a predetermined time period.

Some embodiments may emit predefined audible sounds or tones that are associated with particular types of reminder alarms. For example, a particular sound or tone may be used to present an audible reminder alert 228 (FIG. 2) for a scheduled program, and a different sound or tone may be used to present the audible reminder alert 228 for scheduled event of interest specified by the user. In some embodiments, the user may associate a particular sound or tone with a particular audible reminder alert 228. For example, if the audible reminder alert 228 indicates that it is time for the children of the household to go to bed, a particular song segment may be broadcast. If the audible reminder alert 228 pertains to a program, a recognizable portion of the program's theme song may be broadcast.

Some embodiments may have the remote control 104 execute or request specific extended actions as part of the reminder alert. For example, a remote control 104 may transmit an "off" or "standby" command to various devices following acknowledgment of the alert by the user (or following a specified time out period). Such features could be used, for example, to turn the TV 144 off following issuance of a reminder alert for children to do their homework or to go to bed.

It should be emphasized that the above-described embodiments of the reminder alert system 100 are merely possible examples of implementations of the invention. Many variations and modifications may be made to the above-described embodiments. All such modifications and variations are intended to be included herein within the scope of this disclosure and protected by the following claims.

The embodiments of the invention in which an exclusive property or privilege is claimed are defined as follows:

1. A method comprising:
    transmitting a first wireless signal from a set top box (STB) interface transmitter of a remote control, the first wireless signal having a first command to present an electronic program guide (EPG) on a display of a media presentation device that is communicatively coupled to a set top box (STB);
    receiving the first wireless signal at a remote control interface receiver in the STB;
    retrieving EPG information from a memory of the STB in response to receiving the first wireless signal having the first command from the remote control;
    generating, at a STB processor system in the STB, the EPG based upon the EPG information retrieved from the STB memory;
    communicating the EPG from the STB to the media presentation device, wherein the EPG is presented on the display of the media presentation device;
    transmitting a second wireless signal having a second command from the STB interface transmitter of the remote control, wherein the second command corresponds to a specification for an event of interest identified on the EPG presented on the display of the media presentation device;
    receiving the second wireless signal at the remote control interface receiver in the STB;
    generating, at the STB processor system in the STB, a reminder event in response to receiving the second wireless signal having the second command from the remote control, wherein the reminder event comprises at least a reminder time associated with a scheduled presentation start time of the specified event of interest, and wherein the reminder time is defined by a date and a time;
    transmitting a third wireless signal from a remote control interface transmitter in the STB, the third wireless signal consisting of the reminder time associated with the reminder event;
    receiving the third wireless signal at a STB interface receiver in the remote control;
    comparing a current time with the reminder time of the third wireless signal; and
    in response to the current time reaching the reminder time of the third wireless signal, issuing a reminder alert from the remote control.

2. The method of claim 1, further comprising:
storing the reminder event in a memory of the remote control;
in response to the current time reaching the reminder time, retrieving the reminder event from the memory of the remote control; and
generating the reminder alert based upon the reminder event.

3. The method of claim 1, wherein issuing the reminder alert from the remote control comprises at least one selected from a group consisting of an audible alert reminder, a visual alert reminder, and a vibratory alert reminder.

4. The method of claim 1, further comprising:
accessing supplemental information corresponding to the event of interest from the EPG information retrieved from the STB memory; and
in response to the current time reaching the reminder time, presenting the supplemental information on the display of the media presentation device.

5. The method of claim 1, further comprising:
receiving supplemental information at the STB corresponding to the event of interest;
transmitting a fourth wireless signal from the remote control interface transmitter in the STB, the fourth wireless signal having at least the supplemental information;
receiving the fourth wireless signal at the STB interface receiver in the remote control; and
presenting the supplemental information on a display of the remote control.

6. The method of claim 1, wherein the second command corresponds to a specification of a program of interest scheduled for presentation beginning at a future time indicated on the EPG presented on the display of the media presentation device, and further comprising:
defining the reminder time as the future time scheduled for the beginning of presentation of the program of interest.

7. The method of claim 1, further comprising:
receiving a user specified reminder time from the remote control; and
in response to the current time reaching the user specified reminder time, issuing the reminder alert from the remote control.

8. The method of claim 7, further comprising:
presenting a plurality of predefined messages on a display, wherein each predefined message is associated with unique information of interest;
receiving selection of one of the plurality of predefined messages; and
in response to the current time reaching the reminder time, presenting the selected predefined message on the display of the media presentation device.

9. The method of claim 7, further comprising:
receiving a user defined message from the remote control; and
in response to the current time reaching the reminder time, presenting the user defined message on the display of the media presentation device.

10. A reminder alert system, comprising:
a remote control comprising:
a transmitter configured to transmit a first wireless signal comprising information operable to cause presentation of an electronic program guide (EPG) on a display of a media presentation device, and configured to transmit a second wireless signal operable to cause a specification for an event of interest identified on the EPG presented on the display of the media presentation device;
a reminder alert receiver configured to receive wireless signals transmitted from a set top box; and
at least one of a sound emitter configured to issue an audible reminder alert, a vibration generator configured to issue a vibration reminder alert, and a light source configured to issue a visible reminder alert; and
the set top box comprising:
a receiver configured to receive the first wireless signal transmitted from the remote control with the information operable to cause presentation of the EPG, and configured to receive the second wireless signal transmitted from the remote control with the information operable to specify the event of interest identified on the presented EPG;
a set top box (STB) processing system configured to generate a reminder event based upon the received information operable to specify the event of interest identified on the presented EPG, wherein the reminder event comprises at least a reminder time associated with a scheduled presentation start time of the specified event of interest, and wherein the reminder time is defined by a date and a time; and
a reminder alert transmitter configured to transmit a third wireless signal to the reminder alert receiver of the remote control, the third wireless signal consisting of the reminder time,
wherein the remote control, in response to receiving the third wireless signal transmitted from the set top box, stores the reminder time, and
wherein the remote control issues a reminder alert from at least one of the sound emitter, the vibration generator, and the light source when a current time reaches the reminder time.

11. The reminder alert system of claim 10, wherein the set top box further comprises:
a memory configured to store the reminder event, wherein the reminder event comprises supplemental information pertaining to the reminder event; and
a presentation device interface communicatively coupled to the display of the media presentation device, wherein the supplemental information is presented on the display substantially concurrently with issuance of the reminder alert from the remote control.

12. The reminder alert system of claim 11, wherein the set top box further comprises:
a program content stream interface configured to receive a stream of programming content comprising a plurality of programs, wherein the supplemental information presented on the display of the media presentation device corresponds to supplemental information embedded in the stream of programming content.

13. The reminder alert system of claim 11, wherein the reminder event is an event of interest, wherein the memory is configured to store a plurality of selectable messages that are configured to be presented on the display of the media presentation device, and in response to selection of one of the selectable messages, information corresponding to the selected message is presented on the display of the media presentation device substantially concurrently with transmittal of the reminder alert to the remote control.

14. The reminder alert system of claim 10, wherein the remote control further comprises:
a memory configured to store the reminder time; and
a clock configured to compare the current time with the reminder time.

15. The reminder alert system of claim 10, wherein supplemental information pertaining to the reminder event is communicated from the STB to the remote control, and wherein the remote control further comprises:
a display, wherein the supplemental information is presented on the display substantially concurrently with issuance of the reminder alert from the remote control.

16. A set top box, comprising:
a program content stream interface configured to receive a stream of programming content comprising a plurality of programs;
a memory configured to store at least electronic program guide (EPG) information, wherein the EPG information identifies the plurality of programs and at least a scheduled presentation start time for each of the plurality of programs;
a presentation device interface configured to communicatively couple to a display of a media presentation device;
a remote control interface configured to receive a first wireless signal with a first command from a remote control to present an electronic program command (EPG) on the display of the media presentation device, and configured to receive a second wireless signal with a second command from the remote control that corresponds to a specification of a program of interest identified on the EPG when presented on the display of the media presentation device;
a processing system configured to:
generate the EPG in response to the first command received from the remote control, wherein the EPG is configured to be communicated to the media presentation device for presentation on the display via the presentation device interface; and
generate a reminder event in response to receiving the second command from the remote control, wherein the reminder event comprises at least a reminder time associated with the scheduled presentation start time of the specified program of interest, and wherein the reminder time is defined by a date and a time; and
generate a third wireless signal consisting of the reminder time,
wherein a transmitter of the remote control interface is further configured to communicate the third wireless signal to a reminder alert receiver in the remote control, such that an alert is issued from the remote control when a current time reaches the reminder time.

17. The set top box of claim 16, wherein the reminder event comprises supplemental information pertaining to the reminder event, and wherein the supplemental information is presented on the display of the media presentation device substantially concurrently with issuance of the reminder alert from the remote control.

18. The set top box of claim 16, wherein the reminder event comprises supplemental information pertaining to the reminder event, and wherein a fourth wireless signal comprising the supplemental information is communicated from the STB to the remote control, and wherein the supplemental information is presented on a display of the remote control substantially concurrently with issuance of the reminder alert from the remote control.

* * * * *